United States Patent
Boresta

[15] 3,690,044
[45] Sept. 12, 1972

[54] ADJUSTABLE VENTURI GAS SCRUBBER

[72] Inventor: John G. Boresta, Teaneck, N.J.

[73] Assignee: Chemical Construction Corporation, New York, N.Y.

[22] Filed: March 18, 1970

[21] Appl. No.: 20,579

[52] U.S. Cl. ..................55/223, 55/241, 55/258, 55/259, 261/112, 261/116, 261/DIG. 54
[51] Int. Cl. .............................................B01d 47/10
[58] Field of Search..........55/85, 89, 90, 93, 94, 223, 55/225, 226, 228, 240, 241, 259, 258; 261/DIG. 54, 109, 108, 110, 111, 112, 114, 116

[56] References Cited
UNITED STATES PATENTS

| | | | |
|---|---|---|---|
| 3,597,901 | 8/1971 | Heeney | 55/457 |
| 3,601,374 | 8/1971 | Wheeler | 35/241 |
| 2,964,304 | 12/1960 | Rice | 261/DIG. 54 |
| 3,085,793 | 4/1963 | Pike et al. | 261/DIG. 54 |
| 3,182,977 | 5/1965 | Ernie | 261/DIG. 54 |
| 3,199,267 | 8/1965 | Hausberg | 261/DIG. 54 |
| 3,284,435 | 11/1966 | McIlroy et al. | 261/DIG. 54 |
| 3,317,197 | 5/1967 | Lohner et al. | 261/DIG. 54 |
| 3,388,897 | 6/1968 | Calaceto | 261/111 |
| 3,544,086 | 12/1970 | Willett | 261/109 |
| 3,584,440 | 6/1971 | Vigil | 55/219 |

Primary Examiner—Bernard Nozick
Attorney—J. L. Chaboty

[57] ABSTRACT

An annular venturi gas scrubber in which the throat is adjusted to compensate for changes in gas flow rate by suspending the central conical baffle from a central vertical rod which extends upwards from the apex of the conical baffle and which is vertically movable. Two venturi gas scrubbers are also provided in series within a container and in vertical alignment, with the upper first scrubber having an adjustable throat. The first scrubber removes entrained solid particles from the gas stream and the second scrubber removes gaseous contaminants such as sulfur dioxide.

14 Claims, 3 Drawing Figures

FIG. 1

JOHN G. BORESTA
INVENTOR.

BY *J. J. Chality*
AGENT

JOHN G. BORESTA
INVENTOR.

ADJUSTABLE VENTURI GAS SCRUBBER

BACKGROUND OF THE INVENTION

1. Field of the Invention

The invention relates to an improved apparatus for the scrubbing of a gas stream to remove entrained solid particles and other contaminants such as mist, vapors, or noxious gaseous components such as sulfur dioxide. Numerous industrial or commercial facilities generate hot waste gas streams which are discharged to the atmosphere. These streams may be laden with entrained solids, mists, vapors or gaseous contaminants such as sulfur dioxide, which must be removed prior to atmospheric discharge in order to prevent air pollution or to recover valuable components. Among such facilities may be mentioned furnaces or boilers in which a carbonaceous or hydrocarbon fuel which may contain sulfur is burned, incinerators, iron cupola furnaces, steam-electric power plants, oxygen steel converters, sulfide ore roasters, and black liquor furnaces in wood pulp processing facilities. The entrained solids in the hot discharge gas stream may consist of soot, fly ash, iron oxide particles or various types of dust. In many instances, especially in older existing facilities, the gas stream is directly discharged to the atmosphere through a stack, which serves to disperse the entrained solids, sulfur dioxide, sparks or mist and vapors into the upper atmosphere and thus prevents localized fallout of these contaminants in the surrounding area. In recent years, however, more stringent air pollution regulations have been enacted in many communities, which have necessitated the provision of adequate facilities or apparatus for treating the stack or waste gases so as to remove entrained or contained contaminants and prevent air pollution. In many instances, the installation of conventional devices such as bag filters is not warranted due to the cost of such facilities, and the prior art devices generally fail to compensate for variations in gas flow rate, such as is encountered in periodic cyclic or batch-type processes which generate or discharge gas streams at varying or intermittent flow rates.

2. Description of the Prior Art

Numerous devices have been provided in the prior art for the wet scrubbing of gas streams to remove entrained solid particles. Among the devices which provide a venturi passage or venturi-like scrubbing effect may be mentioned those of U.S. Pat. Nos. 3,317,197; 3,262,685; 3,085,793 and 3,116,348; and U.S. patent applications Nos. 753,583 filed Aug. 19, 1968 now U.S. Pat. No. 3,544,086 and 808,517 filed Mar. 19, 1969 now U.S. Pat. No. 3,584,440. The provision of two venturi gas scrubbers in series, with direct flow of gas and all scrubbing liquid through both venturis, is shown in Canadian Patent No. 788,802; British Patent No. 1,007,452; and Chemical Engineering, issue of Nov. 6, 1967, page 20. Other devices and apparatus assemblages are disclosed in U.S. Pat. No. 3,077,714 and Canadian Patents Nos. 684,884 and 670,150. Other art relative to gas washing or dispersion of a liquid into a gas includes U.S. Pat. Nos. 2,033,404; 2,575,359; 2,086,671; 3,323,290; 2,661,195; 2,354,678; 2,409,088; 3,045,990 and 2,414,718.

SUMMARY OF THE INVENTION

In the present invention, an adjustable annular venturi scrubber is provided in which the central conical baffle is suspended from a vertical rod which extends upwards from an attachment at the apex of the conical baffle, to upper means for vertical displacement or adjustment of the rod and conical baffle, which adjustment thereby modifies the dimension of the annular venturi throat to compensate for changes in gas flow rate, pressure or composition. The rod extends upwards through a vertically oriented coaxial and generally cylindrical and concentric outer conduit, which extends downwards and terminates at a restricted opening adjacent to the apex of the conical baffle. Scrubbing liquid is passed into the conduit at a controlled rate, so as to maintain a liquid body in the conduit which acts as a liquid seal against upwards gas flow between the rod and conduit. In one embodiment of the invention, especially applicable to the scrubbing of flue or stack gases containing fly ash and sulfur dioxide, two vertically oriented venturi scrubbers are provided in series within a container, with the first upper venturi scrubber being adjustable and serving to remove solids particles from a feed gas stream initially containing entrained solids and a gaseous or vaporous contaminant. The scrubbing liquid containing solids particles is separated from the resulting gas stream containing gaseous contaminant, which is passed within the container to the lower venturi for scrubbing with a liquid solution which is a specific absorbent for the gaseous contaminant.

The principal advantage of the adjustable annular venturi of the present invention is that the apparatus may be modified to accommodate for varying gas flow rates or compositions by adjustment or vertical displacement of the central conical baffle, by means of structure which is nonclogging and free of liquid seals which can become inoperative or leaky due to entrance of grit or other solids particles derived from the gas stream. Another advantage is that the adjustable venturi apparatus is simple and readily fabricated. An advantage of the dual or two venturis in series embodiment of the invention is that a compact coacting arrangement is provided and that a slurry of scrubbing liquid containing separated solid particles is removed independently of the second scrubber for removal of gaseous contaminant, which permits economies in the usage of scrubbing liquid and facilitates regeneration or other processing of the second absorbent or scrubbing liquid solution containing the gaseous contaminant separately removed from the gas stream and dissolved in the second solution, which is produced free of the solids originally present in the gas stream. This advantage is especially important when a slurry is used as the second scrubbing solution for removal of gaseous contaminant, since prior removal of solids from the gas stream in the first venturi prevents the buildup of inert solids in the circulating slurry.

It is an object of the present invention to provide an improved apparatus for scrubbing a gas stream with a liquid scrubbing medium, in order to remove contaminants from the gas stream.

Another object is to provide an improved venturi scrubber for scrubbing gas streams.

A further object is to provide an improved annular venturi scrubber with an adjustable throat, for scrubbing gas streams.

An additional object is to provide an adjustable annular venturi scrubber, which may be adjusted or modified to compensate for variations in gas flow rate or to produce a desired degree of gas scrubbing effectiveness.

Still another object is to provide an improved apparatus for scrubbing a gas stream containing solid particles and gaseous contaminant, with separate removal of solids and gaseous contaminant.

Still a further object is to provide an improved two-stage venturi scrubber.

These and other objects and advantages of the present invention will become evident from the description which follows.

DESCRIPTION OF THE DRAWINGS AND PREFERRED EMBODIMENTS

Referring now to the drawings.

Figure 1:
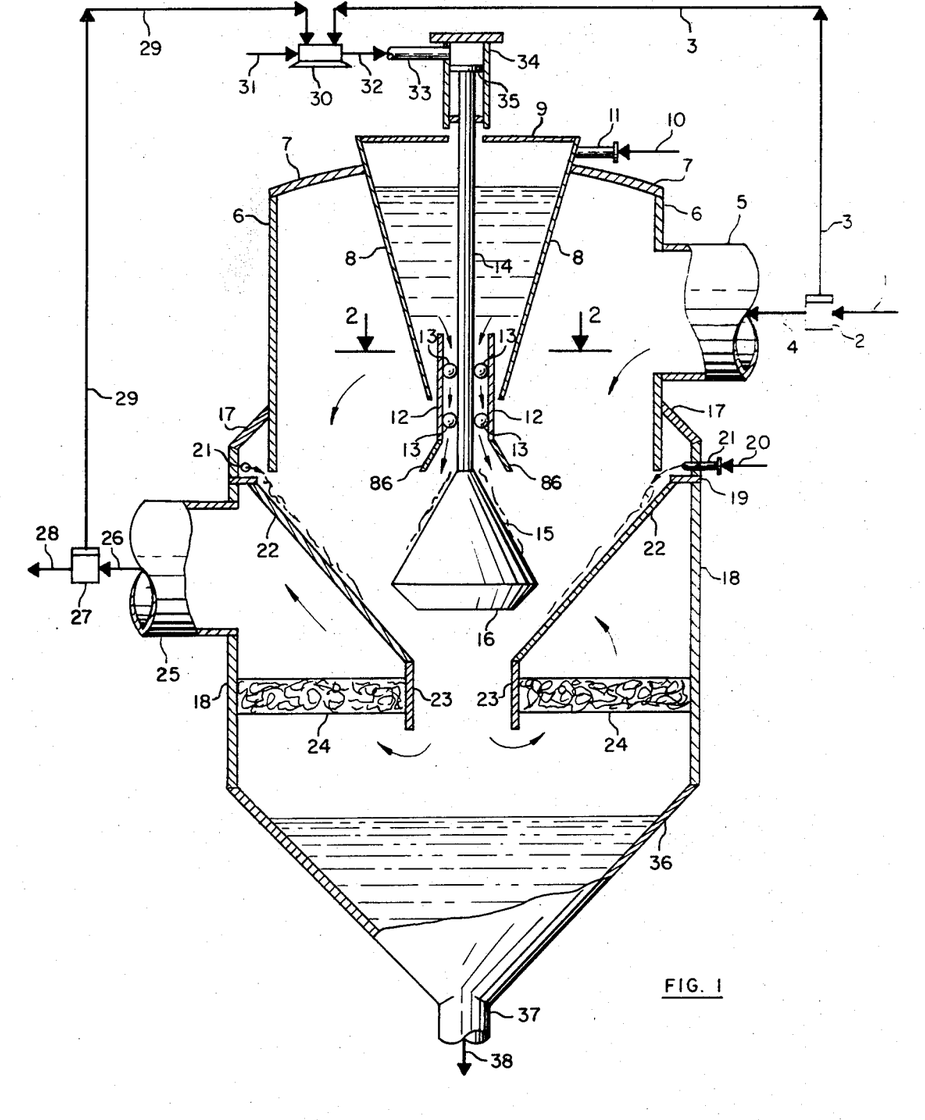
FIG. 1 is a sectional elevation view of the adjustable annular venturi of the present invention.

Referring now to FIG. 1, the contaminant-laden gas stream 1 is derived from a source such as those mentioned supra, or other sources such as a chemical or metallurgical process facility, or the like. The contaminant in gas stream 1 may consist of entrained discrete solid particles such as fly ash, a mist or fog, or vaporous or gaseous constituents such as sulfur dioxide. Stream 1 is typically a flue gas containing fly ash and sulfur dioxide and derived from the combustion of a carbonaceous solid fuel such as coal or a liquid hydrocarbon fuel such as crude oil or fuel oil or Bunker C residual oil derived from petroleum refining.

The pressure of stream 1 is preferably measured typically by the provision of pressure sensing device 2 which may contain a flexible diaphragm or bulb or other sensing means, and a pneumatic or electric signal corresponding to inlet pressure is transmitted from device 2 via line 3. The gas stream passes from device 2 via stream 4 to the horizontal cylindrical inlet conduit 5, which passes the gas stream into the device of the invention for scrubbing with a liquid scrubbing solution or slurry. Conduit 5 extends to the vertically oriented cylindrical container section 6, which is the upper section of the gas scrubbing container. A cover plate 7 is provided at the top of section 6, and a vertically oriented generally cylindrical conduit 8 extends downwards into the container from plate 7. Conduit 8 is coaxial with container 6, and conduit 8 is preferably tapered to a decreasing diameter in a downwards direction, and in some cases conduit 8 may be in the form of an inverted frusto-conical baffle. A horizontal splash plate 9 is provided at the top of conduit 8 to prevent splashing or spilling of the scrubbing liquid solution or slurry stream 10, which passes via nozzle 11 into conduit 8 at a controlled rate, so that a pool or body of scrubbing liquid is maintained in conduit 8. The liquid retained in conduit 8 acts as a liquid seal against upwards flow of gas from the container section 6.

A vertical cylindrical sleeve 12 extends coaxially within the lower portion and through the lower end of conduit 8. A plurality of spaced apart spacers 13 are disposed within sleeve 12 and extend between sleeve 12 and the vertical rod or shaft 14, which is vertically movable or adjustable as will appear infra. The spacers 13 are preferably round or spherical shapes, however elements 13 may also be oval or elliptical in shape or of other suitable form in suitable instances. A frusto-conical flare skirt 86 depends from sleeve 12 in most instances, in order to insure uniform distribution of the liquid flowing downwards in the annular passage between sleeve 12 and rod 14. The vertical rod 14 is preferably cylindrical and extends downwards through conduit 8 and sleeve 12. A conical baffle 15 is attached to the lower end of rod 14, with the upper apex of baffle 15 being welded or otherwise attached to the end of rod 14. An inverted frusto-conical baffle 16 is provided in most cases, with baffle 16 depending downwards from the bottom of conical baffle 15, so that baffles 15 and 16 are suspended from rod 14 and move vertically together with rod 14. The downflowing liquid solution or slurry flowing down from between sleeve 12 and rod 14 flows downwards on the outer surface of baffle 15 and is entrained into the high velocity gas stream adjacent to the lower end of baffle 15.

Returning to the upper container section 6, a frusto-conical baffle 17 depends from the lower portion of section 6, and a lower vertical cylindrical container section 18 depends coaxially downwards from baffle 17. A shelf 19 in the form of a flat horizontal annular ring-shaped baffle extends inwards from the upper end or portion of container section 18, and scrubbing liquid or slurry stream 20 is passed via nozzles 21 into container 18 onto shelf 19. The nozzles 21 are preferably horizontal and tangential to container 18, with the nozzles 21 discharging portions of stream 20 in tandem onto shelf 19 so that stream 20 flows on shelf 19 in a substantially circular flow pattern. The scrubbing liquid or slurry stream 20 flows from shelf 19 onto the upper surface of the inverted frusto-conical baffle 22, which depends downwards from the inner circular edge of shelf 19 and is coaxially and concentrically disposed about and spaced from the central conical baffle 15. The baffle 22 coacts with baffle 15 to form the converging section of an annular venturi gas scrubbing passage. The scrubbing liquid or slurry stream 20 flows downwards on the upper surface of baffle 22 and is entrained inwards into the highly accelerated high velocity gas stream adjacent to the lower terminus of baffle 22. As mentioned supra, the scrubbing liquid or slurry stream flowing downwards on the outer surface of conical baffle 15 is entrained outwards into the highly accelerated high velocity gas stream adjacent to the lower terminus of baffle 15, with the gas stream being accelerated to high velocity by flowing downwards through the annular converging venturi section defined between baffles 15 and 22. The baffle 15 diverts the gas stream against the baffle 22 for impact and removal of entrained solids. The liquid solution or slurry portions, which are entrained into the high velocity gas stream, are dispersed into small droplets which effectively scrub the gas stream and remove contaminants, by virtue of a shearing action of the high velocity gas against the liquid.

A vertical cylindrical baffle 23 depends coaxially downwards from baffle 22, and baffle 23 serves to partially define the throat section of the venturi passage and to conduct the mixture of scrubbed gas and liquid or slurry droplets into the lower portion of container 18, in which the liquid or slurry phase containing contaminant removed from the gas stream is separated from the scrubbed gas phase. The scrubbed gas stream reverses direction in the lower part of container 18, and flows upwards through the annular passage between baffle 23 and container 18. A suitable annular entrainment separator 24 extends between baffle 23 and container section 18, to remove entrained liquid droplets or mist from the rising scrubbed gas stream. Unit 24 will preferably consist of a horizontally oriented annular mesh filter pad as shown, or a packed bed, a plurality of trays or impingement baffles, or the like. Collected liquid flows or drips downwards from unit 24 to the lower part of container section 18. The scrubbed gas stream flows out of container section 18 via conduit 25 as stream 26. Conduit 25 extends from container section 18 below shelf 19 or below the upper end of baffle 22, and in this embodiment of the invention, conduit 25 extends from container 18 above entrainment separator 24 and below shelf 19. The scrubbed gas stream 26 flows through pressure sensing device 27, which is generally similar in configuration and function to unit 2 described supra, and the scrubbed gas stream next passes from unit 27 via stream 28 to suitable disposal or further processing. In instances when the gas stream being scrubbed is a waste gas such as flue gas, stream 28 will generally pass to a stack or the like for dispersion to the atmosphere.

Returning to unit 27, the measurement of gas pressure is converted to an electrical or pneumatic signal which passes via line 29 to controller 30, which also receives the signal conveyed by line 3 and compares the two pressure signals to derive a measurement of gas pressure drop through the scrubbing device. The gas pressure drop is controlled by unit 30, generally to provide constant pressure drop regardless of fluctuations or changes in gas flow rate, by regulating the flow of instrument air stream 31, which passes through unit 30 at a controlled rate or pressure as stream 32, which passes via pipe 33 to air cylinder 34. The upper end of rod 14 extends upwards into cylinder 34 and terminates at piston 35, so that changes in the pressure of instrument air stream 32 pneumatically activates the piston 35 within cylinder 34 to regulate the vertical displacement of rod 14 and attached baffles 15 and 16 and thereby modify the throat opening in the annular venturi scrubber in accordance with changes in gas flow rate or pressure.

Returning to container section 18, the scrubbing liquid or slurry laden with entrained or dissolved contaminant is collected in the lower collection section 36 which is typically in the form of an inverted conical baffle. Scrubbing liquid solution or slurry is removed from the bottom of section 36 via duct 37 as stream 38, which is passed to suitable disposal or treatment. Stream 38 may be physically or chemically processed for regeneration, prior to recycle via streams 10 and 20.

Figure 2:
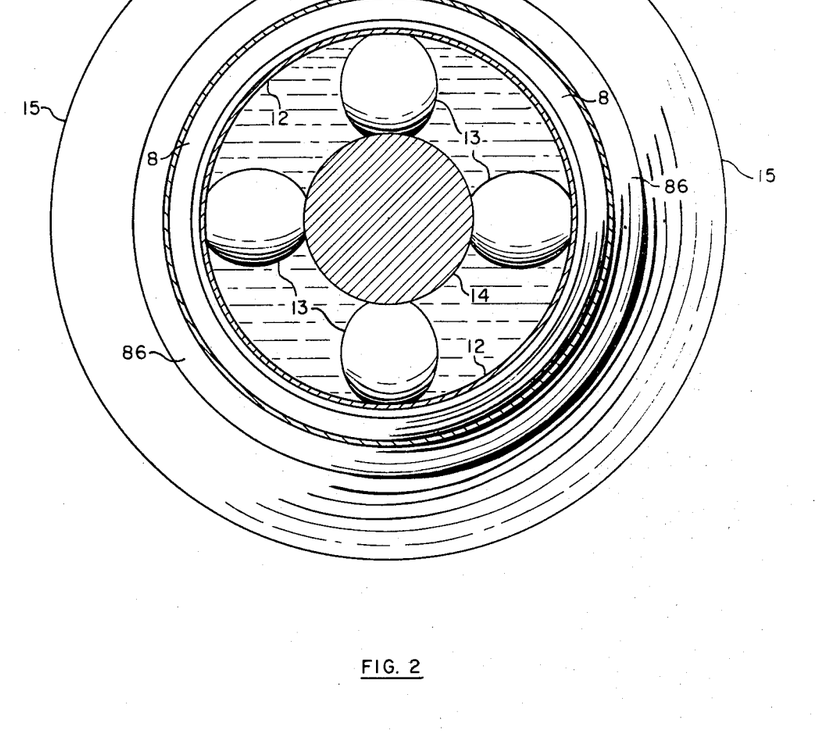
FIG. 2 is a sectional plan view of a portion of FIG. 1, taken on section 2—2.

Referring now to FIG. 2, a sectional plan view of a portion of FIG. 1 is shown, to illustrate the coaxial or concentric arrangement of elements 14, 12, 8, 86 and 15, as well as the upper set of spaced apart spacers 13 extending between the central rod 14 and sleeve 12.

Figure 3:
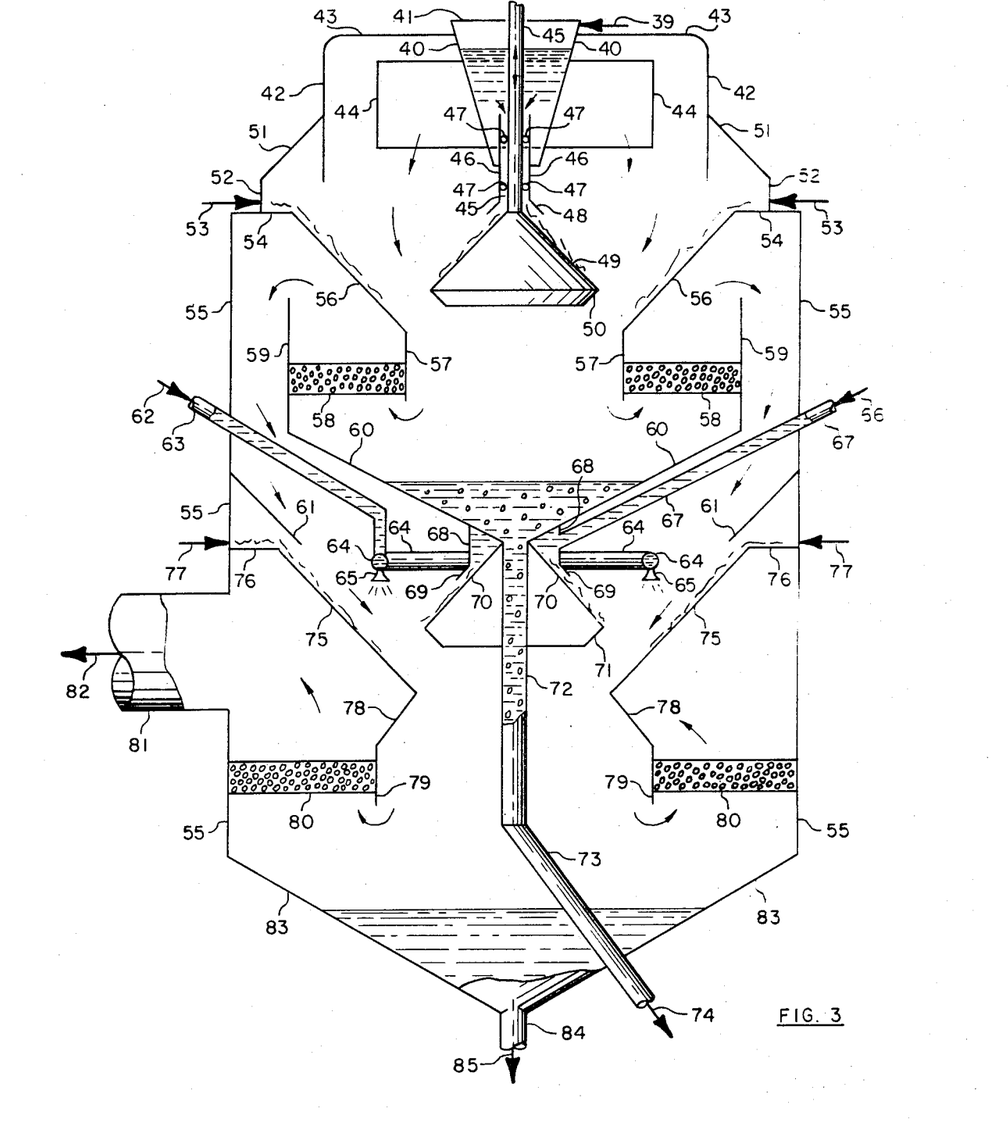
FIG. 3 is a sectional elevation view of one embodiment of the two stage venturi scrubber of the invention.

Referring now to FIG. 3, a sectional elevation view of a preferred embodiment of the invention is shown, in which two venturi scrubbers are provided for series scrubbing of the gas stream in a single container, in which the upper venturi scrubber is adjustable and removes entrained solid particulate contaminant from the gas stream while the lower venturi has a fixed throat and removes gaseous contaminant from the gas stream, using a selective liquid absorbent which dissolves the gaseous contaminant. The apparatus of FIG. 3 will be described relative to the scrubbing of flue or stack gas derived from the combustion of a sulfur-containing fuel such as coal, fuel oil, crude oil, Bunker C residual oil derived from petroleum refining etc. The flue gas stream in this case will contain entrained solid particles of fly ash as well as gaseous sulfur dioxide contaminant.

The upper adjustable annular venturi scrubber of FIG. 3 is preferably similar in configuration and function to the scrubber of FIG. 1 described supra, and this section of FIG. 3 device will therefore be only briefly described. Scrubbing liquid stream 39, which preferably consists of water, passes into the vertically oriented cylindrical or inverted frusto-conical conduit 40, which is provided with upper splash plate 41. A waste flue gas is passed into upper vertical cylindrical container section 42 below upper horizontal cover plate 43 via the rectangular inlet 44, and flows downwards external to conduit 40. A coaxial central cylindrical rod 45 is vertically disposed within conduit 40, and extends downwards from an upper means for vertical rod adjustment or displacement, not shown, and terminates below the lower end of conduit 40. A vertical cylindrical sleeve 46 is spaced between rod 45 and the lower end of conduit 40 by the plurality of spaced apart circular spacers 47 which extend between rod 45 and sleeve 46. A lower frusto-conical flare skirt 48 depends from sleeve 46.

The scrubbing liquid stream 39 is passed into conduit 40 at a controlled rate, so that a body of liquid, which acts as a liquid seal against gas flow, is maintained in conduit 40, and liquid flows downwards between sleeve 46 and rod 45 at a restricted rate. The downflowing liquid flows onto the outer surface of conical baffle 49 which depends from rod 45, with the apex of baffle 49 being attached to the lower end of rod 45. The liquid film or layer flowing downwards on baffle 49 is entrained into the high velocity gas stream adjacent to the base of the conical baffle 49, and an inverted frusto-conical baffle 50 depending from baffle 49 is preferably provided to diminish gas turbulence.

Returning to container inlet section 42, a vertical frusto-conical baffle section 51 extends downwards and outwards from section 42 to a vertical cylindrical container section 52, which depends downwards from baffle 51 and is provided with nozzle means or the like, not shown, for entry of scrubbing liquid streams 53 into the container. Streams 53 preferably consist of water or other scrubbing liquid similar to streams 39. Streams 53 are passed onto the circular horizontal annular shelf 54, and the main vertically oriented cylindrical container section 55 depends downwards from shelf 54. Container section 55 may depend from the outer edge of shelf 54, or directly below section 52, or any similar configuration may be adopted in practice. An inverted frusto-conical baffle 56 depends from the inner edge of shelf 54, and streams 53 flow from shelf 54 onto baffle 56 and downwards as a film or layer on the upper surface of baffle 56.

The waste gas stream is accelerated to high velocity while flowing downwards through the annular converging venturi passage defined between baffles 49 and 56, and the scrubbing liquid entrained from the lower ends of baffles 49 and 56 into the high velocity gas stream is dispersed into a large number of small droplets which effectively scrub the gas stream and remove solid fly ash particles. The resulting mixture of liquid droplets containing fly ash particles, and gas phase substantially free of fly ash, passes downwards from the converging venturi passage into the coaxial cylindrical baffle 57, which depends from baffle 56. The gas phase reverses direction below the lower end of baffle 57, and flows upwards through the annular packed bed 58 disposed between baffle 57 and the concentric outer vertical cylindrical baffle 59. The liquid phase collects in the retention baffle 60, which is generally in the form of an inverted conical or funnel-shaped baffle depending from baffle 59. The liquid phase in receptacle 60 will generally be in the form of a slurry due to contained solid particles of fly ash.

The gas phase passes upwards through packed bed 58, which acts as an entrainment separator to remove residual liquid droplets which collect in receptacle 60. The gas phase discharged upwards above bed 58 reverses direction above the upper end of baffle 59, and flows downwards through the outer annular passage between baffle 59 and container 55. The resulting downflowing annular gas stream is diverted inwards and into a second and lower annular venturi scrubbing passage of fixed throat dimension by the inverted frusto-conical baffle 61, which extends downwards and inwards from the wall of container 55 below the lower end of baffle 59.

A liquid solution or slurry stream 62 is passed via inclined pipe 63 into manifold 64. Stream 62 is selective absorbent for the gaseous contaminant in the gas stream, which in the present instance of flue gas scrubbing consists of sulfur dioxide. Stream 62 in this case usually consists of an aqueous solution or slurry containing a dissolved alkaline component such as the hydroxide or carbonate of sodium, potassium, calcium or magnesium or the like. The aqueous alkaline solution or slurry passes from manifold 64 into the plurality of spaced apart dependent spray nozzles 65, which extend downwards from manifold 64 and spray the alkaline solution or slurry downwards into the lower annular venturi passage.

Further aqueous alkaline scrubbing solution or slurry is passed via stream 66 into inclined pipe 67, which conducts the absorbent solution into the device for gaseous contaminant removal, with stream 66 generally being similar in composition and function to stream 62. Stream 66 is passed via pipe 67 into the vertical cylindrical distribution baffle 68, which preferably depends coaxially from unit 60 and is preferably provided with a dependent lower frusto-conical flare skirt 69, which is disposed about the upper end of central conical baffle 70. The coaxial central baffle 70 is fixed in place, dependent from unit 60, and provides for an annular venturi throat section of fixed dimension. An inverted frusto-conical baffle 71 preferably depends from baffle 70 to prevent gas turbulence in the device, and liquid solution or slurry stream 66 flows downwards from within member 68 onto the surface of baffle 70, and is entrained from the lower end of baffle 70 into the highly accelerated and high velocity gas stream.

A central slurry removal pipe 72 extends vertically downwards from unit 60 through the apex and central axis of baffle 70, to an inclined pipe 73 which conducts the slurry stream 74 collected upon unit 60 to suitable disposal, which may include settling or filtration and suitable waste disposal as by fly ash dumping or the like.

The central conical baffle 70 coacts with concentric outer inverted frusto-conical baffle 75 to provide a vertical converging section of the second annular venturi passage, in which the gas stream is diverted against baffle 75. Baffle 75 is attached to the wall of container 55 by the substantially horizontal annular circular shelf 76, and scrubbing liquid solution or slurry streams 77, which are generally similar in composition and function to streams 62 and 66, are passed onto shelf 76 by nozzle means or the like, not shown, with the absorbent solution or slurry then flowing downwards on baffle 75 for entrainment into the gas stream from the lower end of baffle 75.

The several liquid streams 62, 66 and 77 are entrained or sprayed into the gas stream in the second annular venturi passage, which is of fixed throat dimension, and gaseous contaminant such as sulfur dioxide is absorbed into the liquid phase and may react with the alkaline medium to form sulfites, bisulfites or the like.

A frusto-conical baffle 78 depends downwards from the lower end of baffle 75 for pressure regain, and a vertical cylindrical baffle 79 depends downwards from the lower end of baffle 78 and serves to conduct the mixture of liquid droplets and scrubbed gas phase downwards into a lower gas-liquid separating section. The gas phase discharged from baffle or conduit 79 reverses direction below the lower end of section 79, and flows outwards and upwards through packed bed 80, which serves to remove entrained liquid droplets from the gas phase. The fully scrubbed gas phase, now substantially free of entrained fly ash or other solid particles, due to scrubbing in the upper adjustable annular venturi scrubber, and substantially free of gaseous contaminants such as sulfur dioxide due to scrubbing in the lower fixed throat annular venturi scrubber, is removed from container 55 between shelf 76 and bed 80 via conduit 81 as stream 82.

Scrubbing liquid solution or slurry laden with absorbed gaseous contaminant is collected in the lower inverted conical or funnel-shaped section 83 which depends from container 55, and is removed via outlet pipe 84 as stream 85, which is passed to suitable disposal or regeneration.

As is evident from the description supra, numerous alternatives within the scope of the present invention will occur to those skilled in the art. The various liquid distribution shelves 19, 54 or 76 may be omitted in some instances, or horizontal weirs which may be serrated or notched may be provided in some cases. Other suitable means for distribution of liquid onto the surface of the central conical baffle 15, 49 or 70 may be provided in practice. Stream 74 may in some cases contain a very minor proportion of dissolved contaminant derived from the gas stream scrubbing in the upper venturi. Various means for vertical adjustment or movement of rods 14 or 45 may be adopted in practice, such as various types of gearing or handwheels which may be manually adjustable. Reference to a scrubbing liquid will be understood to encompass a scrubbing slurry, with the scrubbing slurry containing solid particles as well as a liquid phase.

In some instances, stream 10 may contain a small proportion of entrained solid particles, especially when stream 38 is processed for partial solids removal and recycled. In this case, nozzle 11 will be tangential to conduit 8 so as to provide for tangential entry of stream 10 into conduit 8 and cyclonic or circular flow of liquid downwards within conduit 8, so as to cause deposition of solids against the inner wall of conduit 8 and the formation of a central region of clean liquid which flows downwards adjacent to rod 14 and through sleeve 12. Periodic or eventual removal of solids from the lower annular space between sleeve 12 and conduit 8 will then be required. In this case, an annular removal ring may be mounted at the lower end of conduit 8, with the ring extending between conduit 8 and sleeve 12 and being periodically removed during shutdown periods to permit removal of accumulated solids from conduit 8.

I claim:

1. An apparatus for scrubbing a contaminant from a gas stream with scrubbing liquid which comprises a vertically oriented cylindrical container, a vertical rod, said rod extending coaxially downwards into said container, a conical baffle, said conical baffle depending downwards from said rod with the apex of said conical baffle being attached to the lower end of said rod, whereby said conical baffle is coaxially mounted within said container, means to vertically displace said rod, whereby the elevation of said conical baffle within said container is adjusted, a vertically oriented inverted frusto-conical conduit, said conduit being coaxially mounted about said rod at the upper end of said container, a vertical cylindrical sleeve, said sleeve being coaxially mounted between said rod and the lower end of said conduit by a plurality of fixed spacers which are spaced apart and extend between said rod and said sleeve, means to pass a first stream of scrubbing liquid into said conduit at a controlled rate, whereby said conduit is maintained at least partially filled with scrubbing liquid by the restricted opening between said rod and said sleeve and thereby maintains a liquid seal against upwards gas flow through said conduit, and whereby said first stream of scrubbing liquid flows downwards in the annular passage between said rod and said sleeve, onto the apex of said conical baffle, and downwards on the outer surface of said conical baffle, an inverted frusto-conical baffle, said inverted frusto-conical baffle depending coaxially downwards within said container from an upper contiguous connection with the inner wall of said container, said inverted frusto-conical baffle being spaced from and concentrically about said conical baffle, whereby a downwardly converging annular gas flow passage is defined between said conical baffle and said inverted frusto-conical baffle, means to pass a second stream of scrubbing liquid downwards on the inner surface of said inverted frusto-conical baffle, means to pass a contaminant-laden gas stream into said container above said baffles, whereby said gas stream is accelerated to high velocity by flowing downwards through said converging annular gas flow passage and said first and second streams of scrubbing liquid are entrained into the high velocity gas stream from the lower ends of said baffles, said contaminant being thereby entrained in the resulting liquid droplets, means to remove the resulting scrubbing liquid containing entrained contaminant from the lower portion of said container, and means extending from said container below the upper end of said inverted frusto-conical baffle to remove the resulting scrubbed gas stream from said container.

2. The apparatus of claim 1, in which said means to vertically displace said vertical rod are adjusted in proportion to change in the pressure differential between the pressure of said contaminant-laden gas stream and the pressure of said scrubbed gas stream.

3. The apparatus of claim 1, in which said means to vertically displace said rod is a compressed air cylinder mounted about the upper end of said rod, with the upper end of said rod forming the piston of said air cylinder, together with means to adjust the pressure of the air passed to said air cylinder.

4. The apparatus of claim 1, in which a frusto-conical skirt baffle depends downwards from the lower end of said sleeve and concentrically adjacent to the apex of said conical baffle.

5. The apparatus of claim 1, in which a vertical cylindrical baffle depends coaxially downwards from said inverted frusto-conical baffle within said container.

6. The apparatus of claim 5, in which annular substantially horizontal means for separation of entrained liquid droplets extends between said vertical cylindrical baffle and said vertically oriented container, and said means extending from said container to remove the resulting scrubbed gas stream from said container is disposed between said means for separation of entrained liquid droplets and the upper end of said inverted frusto-conical baffle.

7. An apparatus for scrubbing solid and gaseous contaminants from a gas stream which comprises a vertically oriented cylindrical container, a first vertically oriented venturi scrubber within said container, said first venturi scrubber being defined by an upper inverted frusto-conical baffle which provides a converging section, and a throat section below said inverted frusto-conical baffle, said first venturi scrubber being coaxially disposed in the upper section of said container and provided with means to adjust the venturi throat section to compensate for variation in gas flow, means to pass a gas stream containing solid and gaseous contaminants into said container above said first venturi scrubber, whereby said gas stream flows downwards through said first venturi scrubber and is accelerated to high velocity, means to pass a first scrubbing liquid stream into said first venturi scrubber, whereby said first scrubbing liquid stream scrubs said gas stream in said first venturi scrubber and removes solid contaminants, means below said first venturi scrubber to separate first scrubbing liquid containing entrained solids from the resulting gas stream, means to remove the separated first scrubbing liquid containing entrained solids from said container, said resulting gas stream containing gaseous contaminant and being substantially free of solid contaminant, a second vertically oriented venturi scrubber within said container, said second venturi scrubber being defined by an upper inverted frusto-conical baffle which provides a converging section, and a throat section below said inverted frusto-conical baffle, said second venturi scrubber being coaxially disposed in the lower section of said container and provided with a fixed throat section of constant dimensions, means within said container to pass said resulting gas stream containing gaseous contaminant from the upper section of said container downwards through said second venturi scrubber, whereby said gas stream is accelerated to high velocity, means to pass a second scrubbing liquid stream into said second venturi scrubber, said second scrubbing liquid stream being a selective absorbent for said gaseous contaminant present in said resulting gas stream, whereby said second scrubbing liquid stream scrubs said gas stream in said second venturi scrubber and dissolves gaseous contaminant, means below said second venturi scrubber to separate second scrubbing liquid containing dissolved contaminant from the residual gas stream, means extending from said container to remove the separated second scrubbing liquid containing dissolved contaminant from said container, and means extending from said container to remove said residual gas stream of diminished contaminants content from said container said first and second venturi scrubbers being annular venturi scrubbers, each venturi scrubber being provided with a central conical baffle which is coaxial with said container, together with means to pass scrubbing liquid downwards on the surface of said central conical baffle, said central conical baffle being coaxial with and spaced centrally within said inverted frusto-conical baffle whereby said central conical baffle and said inverted frusto-conical baffle define an annular converging gas flow passage, and means to pass scrubbing liquid downwards on the upper surface of said inverted frusto-conical baffle, the central conical baffle of said first venturi scrubber being vertically moveable whereby the throat section of said first venturi scrubber is adjustable in dimension.

8. The apparatus of claim 7, in which said first venturi scrubber includes a first coaxial cylindrical baffle which depends downwards from said upper inverted frusto-conical baffle, a central means below said coaxial cylindrical baffle for removal of separated first scrubbing liquid containing entrained solids from said container, a second coaxial cylindrical baffle within said container for gas diversion, said diversion baffle being spaced from the wall of said container and extending upwards from said central removal means and concentrically external to said first cylindrical baffle and terminating below said upper inverted frusto-conical baffle, and annular substantially horizontal means for separation of entrained liquid droplets from said resulting gas stream, said annular separation means extending between said first cylindrical baffle and said second cylindrical baffle, whereby said resulting gas stream flows downwards through said first cylindrical baffle, upwards through the annular passage between said first cylindrical baffle and said second cylindrical baffle, and downwards to said second venturi scrubber through the annular passage between said second cylindrical baffle and said container.

9. The apparatus of claim 7, in which said gaseous contaminant is sulfur dioxide, and said second scrubbing liquid stream comprises an aqueous solution containing a dissolved alkaline component selected from the group consisting of the hydroxides and carbonates of sodium, potassium, calcium and magnesium.

10. The apparatus of claim 7, in which a horizontal circular liquid distribution manifold is disposed above the throat section of the second annular venturi scrubber, a plurality of spray nozzles depend downwards from said manifold, and means are provided to pass second scrubbing liquid to said manifold, whereby second scrubbing liquid is sprayed downwards into the throat section of said second annular venturi scrubber.

11. The apparatus of claim 7, in which a vertical rod extends coaxially downwards into said container, the conical baffle of said first vertically oriented annular venturi scrubber depending downwards from said rod with the apex of said conical baffle being attached to the lower end of said rod, whereby said conical baffle is coaxially suspended within said container, together with means to vertically displace said rod, whereby the elevation of said conical baffle within said container is adjusted and said first vertically oriented annular venturi scrubber is thereby provided with an adjustable throat section.

12. The apparatus of claim 11, in which said means to pass first scrubbing liquid downwards on the surface of the central conical baffle of said first annular venturi scrubber is means for discharge of first scrubbing liquid at the apex of said conical baffle comprising a vertically oriented inverted frusto-conical conduit, said conduit being coaxially mounted about said rod at the upper end of said container, the lower end of said conduit having at least one restricted opening for downwards liquid flow adjacent to the apex of said conical baffle, together with means to pass first scrubbing liquid into said conduit at a controlled rate, whereby said conduit is maintained at least partially filled with scrubbing liquid by said restricted opening and thereby maintains a liquid seal against upwards flow of said contaminant-laden gas stream through said conduit.

13. The apparatus of claim 12, in which a vertical cylindrical sleeve is coaxially mounted between said rod and the lower end of said conduit by a plurality of fixed spacers which are spaced apart and extend between said rod and said sleeve, whereby said first scrubbing liquid flows downwards in the annular passage between said rod and said sleeve.

14. An apparatus for scrubbing solid and gaseous contaminants from a gas stream which comprises a vertically oriented cylindrical container, a vertical rod, said rod extending coaxially downwards into said container, a first vertically oriented venturi scrubber within said container and below said rod, said first venturi scrubber being defined by a first central conical baffle and a first inverted frusto-conical baffle coaxially disposed in the upper portion of said container, said first conical baffle depending downwards from said rod with the apex of said conical baffle being attached to the lower end of said rod, whereby said conical baffle is coaxially mounted within said container, means to vertically displace said rod, whereby the elevation of said conical baffle within said container is adjusted to compensate for variation in gas flow, a vertically oriented inverted frusto-conical conduit, said conduit being coaxially mounted about said rod at the upper end of said container, a vertical cylindrical sleeve, said sleeve being coaxially mounted between said rod and the lower end of said conduit by a plurality of fixed spacers which are spaced apart and extend between said rod and said sleeve, means to pass a first stream of scrubbing liquid into said conduit at a controlled rate, whereby said conduit is maintained at least partially filled with scrubbing liquid by the restricted opening between said rod and said sleeve and thereby maintains a liquid seal against upwards gas flow through said conduit, and whereby said first stream of scrubbing liquid flows downwards in the annular passage between said rod and said sleeve, onto the apex of said first conical baffle, and downwards on the outer surface of said first conical baffle, said first inverted frusto-conical baffle depending coaxially downwards within said container from an upper contiguous connection with the inner wall of said container, said first inverted frusto-conical baffle being spaced from and concentrically about said first conical baffle, whereby a downwardly converging annular gas flow passage is defined between said first conical baffle and said first inverted frusto-conical baffle, means to pass a second stream of scrubbing liquid downwards on the inner surface of said first inverted frusto-conical baffle, means to pass a gas stream containing solid and gaseous contaminants into said container above said first venturi scrubber, whereby said gas stream flows downwards through the converging passage between said first conical baffle and said first inverted frusto-conical baffle and is accelerated to high velocity, and whereby said first and second streams of scrubbing liquid are entrained into the high velocity gas stream from the lower ends of said first baffles, solid contaminant being thereby entrained in the resulting liquid droplets, means below said first venturi scrubber to separate scrubbing liquid containing entrained solids from the resulting gas stream, means to remove the separated scrubbing liquid containing entrained solids from said container, said resulting gas stream containing gaseous contaminant and being substantially free of solid contaminant, a second vertically oriented venturi scrubber within said container, said second venturi scrubber being defined by a second central conical baffle and a second inverted frusto-conical baffle which provide a converging section, and a throat section below said second baffles, said second venturi scrubber being coaxially disposed in the lower section of said container and provided with a fixed throat section of constant dimensions, means within said container to pass said resulting gas stream containing gaseous contaminant from the upper section of said container downwards through said second venturi scrubber, whereby said gas stream is accelerated to high velocity, means to pass a stream of liquid absorbent for said gaseous contaminant into said second venturi scrubber, whereby said liquid absorbent scrubs said gas stream in said second venturi scrubber and dissolves gaseous contaminant, means below said second venturi scrubber to separate liquid absorbent containing dissolved contaminant from the residual gas stream, means extending from said container to remove the separated liquid absorbent containing dissolved contaminant from said container, and means extending from said container to remove said residual gas stream of diminished contaminants content from said container.

* * * * *